(No Model.) 2 Sheets—Sheet 1.

W. P. CLARK.
COMBINED PLOW AND HARROW.

No. 369,589. Patented Sept. 6, 1887.

WITNESSES:
Fred G. Dieterich
Jason E. Kenno

INVENTOR:
W. P. Clark
BY Munn & Co.
ATTORNEYS.

N. PETERS, Photo-Lithographer, Washington, D. C.

(No Model.) 2 Sheets—Sheet 2.
W. P. CLARK.
COMBINED PLOW AND HARROW.
No. 369,589. Patented Sept. 6, 1887.
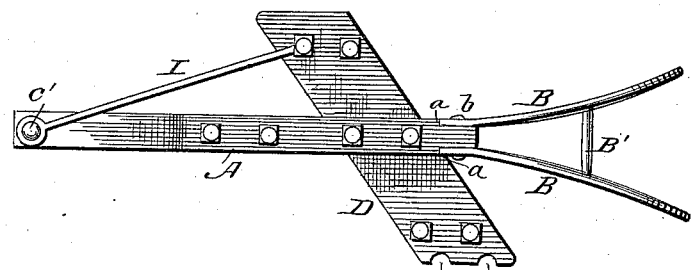
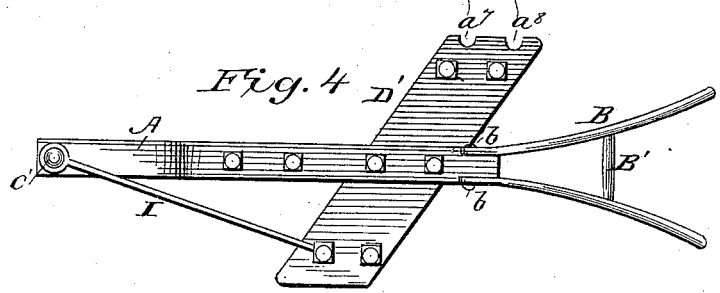
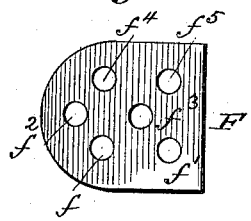
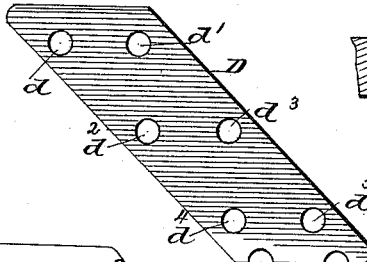
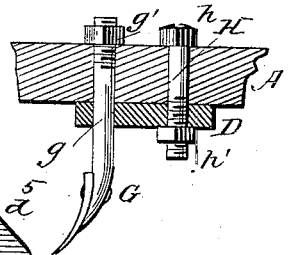
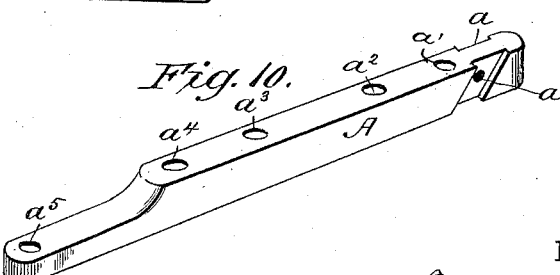
WITNESSES:
Fred G. Dieterich
Leon E. Kernan
INVENTOR:
W. P. Clark
BY Munn & Co
ATTORNEYS.

United States Patent Office.

WILLIAM P. CLARK, OF ELBERTON, GEORGIA, ASSIGNOR OF ONE HALF TO THOMAS M. SWIFT, OF SAME PLACE.

COMBINED PLOW AND HARROW.

SPECIFICATION forming part of Letters Patent No. 369,589, dated September 6, 1887.

Application filed July 16, 1887. Serial No. 244,550. (No model.)

*To all whom it may concern:*

Be it known that I, WILLIAM P. CLARK, of Elberton, in the county of Elbert and State of Georgia, have invented a new and useful Improvement in Combined Plow and Harrow, of which the following is a specification.

The object of my invention is to provide a combined implement having interchangeable parts, which may be connected or bolted together in various ways to form an A or V harrow, a right or left side harrow, or a cultivating-plow; and the improvement consists in certain novel constructions and combinations of parts hereinafter described.

Figure 1:
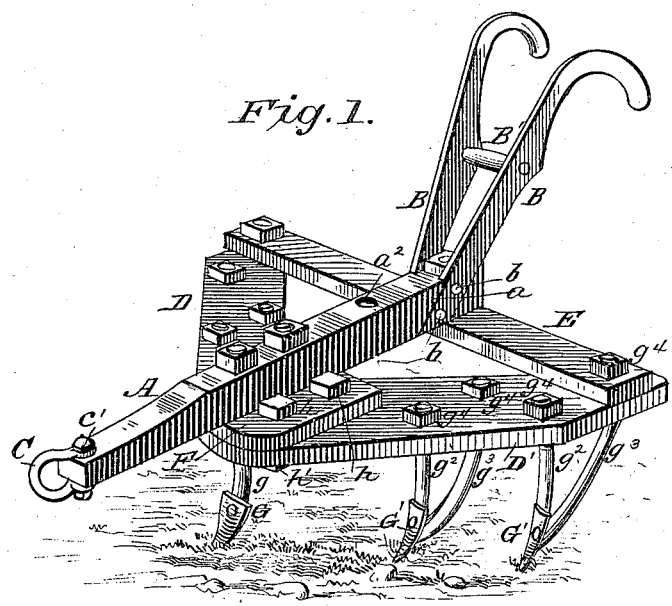
Figure 5:
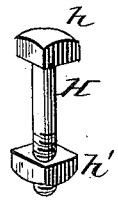
Figure 2:
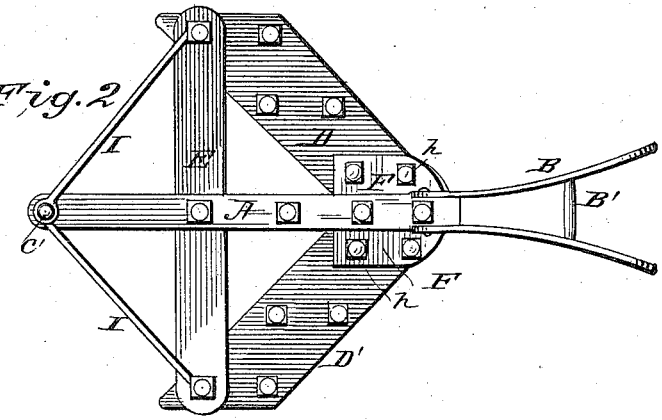
Figure 6:
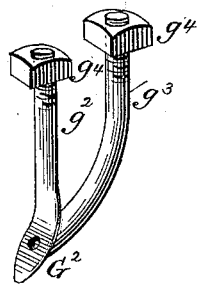

In the accompanying drawings, Figure 1 is a perspective of an A or V harrow formed according to my invention; Fig. 2, a plan of some of the parts shown in Fig. 1 arranged to form a cultivator; Fig. 3, a plan of some of said parts arranged to form a right-hand harrow; Fig. 4, a plan of some of said parts arranged to form a left-hand harrow, and Figs. 5 to 10 are plans of details or separate parts of my invention.

The beam A is mortised at $a$ to receive the lower ends of handles B, secured thereto by bolts $b$ and held at an angle with each other by a brace, B', in a well-known manner.

The beam A has holes passing vertically through it at $a', a^2, a^3, a^4,$ and $a^5,$ and is reduced in thickness at its forward end to lighten it and to receive the clevis C, which is secured thereto by a bolt, $c'$, passing through the hole $a^5$.

In the device shown in Figs. 1 and 2 the beam A or handles B are secured to the upper side of a triangular frame, which is composed of the tooth-supporting bars D D', each having holes $d\ d'\ d^2\ d^3\ d^4\ d^5$ and half-holes $d^7\ d^8$ at their apex or meeting ends, a cross-bar, E, having holes $e\ e'\ e^2$, and an apex-block, F, having holes $f\ f'\ f^2\ f^3\ f^4\ f^5$. The bar E and block F are each placed upon the upper side of the bars D D', and the beam A is placed above the bar E and block F.

The shanks $g$ of harrow-teeth or shovel-foot G are passed up through the overlying or matched holes in the said bars, block, and beam, and are screw-threaded and fitted with nuts $g'$, which both securely hold said parts together and support the harrow-teeth and shovels. When harrow-teeth and shovels are not used, a bolt, H, with a head, $h$, and nut $h'$, may be employed to hold said parts together. The plow-shovels G' are preferably secured to a foot, G², having double shanks $g^2\ g^3$, each of which is screw-threaded and fitted with nuts $g^4$, which hold the feet securely to the tooth-supporting bars.

The cross-bars E and block F hold the under side of the beam A parallel with the upper side of the tooth-supporting bars D D', and adapt the parts to be bolted solidly together.

The double shanks $g^2\ g^3$ of a foot, G², pass through the half-holes $d^7\ d^8$ of the bars D D' and through the middle holes, $f^2\ f^3$, of the block F, and together with bolts H upon the sides thereof hold the said parts securely together.

In Fig. 1 the apex of the triangular frame is located at the forward end of the frame, and in Fig. 2 said apex is located at the rear end thereof.

The plow-shovels G' are secured to the middle holes, $d^2\ d^3$, of the bars D D' to form a double-plow cultivator, and the remaining joints are secured together by bolts H. The cross-bar E in Fig. 2 is at the forward end of the plow, and is braced at its ends by rods I, secured at their forward ends to the beam A by the clevis-bolt $c'$.

When a right-hand-side harrow, as shown in Fig. 3, is required, a single tooth-supporting bar, D, is secured to the beam by bolts or tooth-holding shanks $g^2\ g^3$, which pass through the middle holes, $d^2\ d^3$, of the bar D and through the rear holes, $a'\ a^2$, in the beam. Harrow-teeth G are secured to the bar D, as hereinbefore described, and the forward end of said bar is connected by a brace-rod, I, with the forward end of the beam.

A left-hand-side harrow is formed by substituting the bar D' for the bar D, thus bringing the forward end of said bar upon the left-hand side of the plow.

The tooth and shovel supporting feet G are both reversible and adjustable upon the tooth-supporting bars D D', and the bolts H are interchangeable with said feet to adapt the device to the various constructions and uses hereinbefore described.

I am aware that variously-constructed implements convertible into plows or harrows by means of interchangeable tooth-supporting bars, cross-bars, and braces, and a beam with handles have been bolted together, and that a double-shanked tooth or shovel supporting foot has been employed to unite some of said parts, and do not broadly claim such devices. The leading and essential difference between said devices and my improvement consists in the novel details of construction and means employed for uniting the various parts firmly together without having to mortise or cut away the meeting surfaces or joints of the connecting parts, thereby securing strength, simplicity, and cheapness. The apex-block F serves as a filling-piece, of equal thickness with the cross-bar E, to provide flat surfaces upon an even plane, to which the beam and tooth-supporting bars may be supported.

I claim as my invention and desire to secure by Letters Patent—

1. A combined plow and harrow having interchangeable parts, consisting of the tooth-supporting bars D D′, the cross-bar E, and apex-block F, fitted upon the upper side of said tooth-supporting bars, a beam fitted at one end with handles and bolted at the upper side of the said bar E, and block F, substantially as described.

2. In a combined plow and harrow, the tooth-supporting bars, each having corresponding double rows of holes diagonally disposed and double bolt-recesses $d^7$ $d^8$ at their meeting ends, a beam provided with handles, a block, F, having double sets of holes, and cross-braces, substantially as described.

WILLIAM P. CLARK.

Witnesses:
W. T. VAN DUZER,
JOHN P. SHANNON.